United States Patent
Turner et al.

(10) Patent No.: US 6,754,067 B2
(45) Date of Patent: Jun. 22, 2004

(54) INSTRUMENT ASSEMBLY SYSTEMS, HOUSING AND METHODS OF MOUNTING INSTRUMENT ASSEMBLIES

(75) Inventors: Scott A. Turner, Pittsburgh, PA (US); Christopher D. Starta, Pittsburgh, PA (US)

(73) Assignee: Mine Safety Appliances Company, Pittsburgh, PA (US)

(*) Notice: Subject to any disclaimer, the term of this patent is extended or adjusted under 35 U.S.C. 154(b) by 0 days.

(21) Appl. No.: 10/236,081

(22) Filed: Sep. 6, 2002

(65) Prior Publication Data

US 2004/0047114 A1 Mar. 11, 2004

(51) Int. Cl.$^7$ ............................................. H01K 33/945
(52) U.S. Cl. ....................... 361/659; 361/663; 361/666; 439/498; 439/517
(58) Field of Search ...................... 174/50, 50.5, 52.1; 116/63 R, 201, 209, 264; 439/378–381, 517; 361/600, 601, 641, 659, 664, 667, 670, 671

(56) References Cited

U.S. PATENT DOCUMENTS

| | | | |
|---|---|---|---|
| 3,800,268 A | * | 3/1974 | Bruckner et al. ........... 439/381 |
| 3,808,577 A | * | 4/1974 | Mathauser .................... 439/39 |
| 4,129,896 A | * | 12/1978 | Young ........................ 361/666 |
| 5,391,091 A | * | 2/1995 | Nations ....................... 439/378 |
| 6,165,009 A | * | 12/2000 | Anbo et al. ................. 439/498 |
| 6,520,798 B1 | * | 2/2003 | Robinson et al. ........... 439/517 |

* cited by examiner

Primary Examiner—Michael Datskovskiy
(74) Attorney, Agent, or Firm—James G. Uber; Henry E. Bartony, Jr.

(57) ABSTRACT

An instrument system includes an instrument assembly having at least one fitting projecting therefrom. The instrument system further includes at least a first housing member including at least one alignment member located therein. The alignment member preferably includes at least one sloped surface which slopes toward at least one seating adapted to seat the at least one fitting of the instrument assembly. The instrument system further includes a second housing member which forms an explosion-proof enclosure with the first housing member to enclose the instrument assembly. The second housing member preferably forms an explosion-proof enclosure with the first housing member via cooperating threading. The instrument assembly can, for example, include electrical components for a combustible gas sensor.

12 Claims, 7 Drawing Sheets

INSTRUMENT ASSEMBLY SYSTEMS, HOUSING AND METHODS OF MOUNTING INSTRUMENT ASSEMBLIES

BACKGROUND OF THE INVENTION

The present invention relates generally to instrument assembly systems, housings and methods of mounting instrument assemblies, and, more particularly, to instrument assembly systems, housings and methods of mounting instrument assemblies in explosion-proof housings wherein alignment of the instrument assembly is facilitated.

Instrument assemblies (for example, sensor assemblies) are typically retained in housings (explosion-proof housings in certain environments) using mechanical hardware requiring the use of special tools for installation/removal such as, but not limited to, standoffs, nuts, retaining rings, etc. Moreover, the installer must visually align or orient the instrument assembly in the housing before it can be secured using such tools.

Alignment and mounting of many instrument assemblies is very difficult under the best of condition. Moreover, instrument housings are often placed in positions that can restrict access. Further, many instrument housings are located in industrial environments, many of which are hazardous, and the instrument assemblies therein must be connected/disconnected by industrial workers who may be wearing personal protective clothing such as gloves. Such personal protective clothing can be cumbersome, further increasing the difficulty in aligning and mounting such instrument assemblies, particularly where tooling is required and/or the instrument assembly is relatively small in size.

It is, therefore, desirable to develop instrument assembly systems, housings and methods of mounting instrument assemblies that reduce or eliminate the above and other problems.

SUMMARY OF THE INVENTION

In one aspect, the present invention provides an instrument system including an instrument assembly having at least one fitting projecting therefrom. The instrument system further includes at least a first housing member including at least one alignment member located therein.

In one embodiment, the alignment member comprises at least one surface which slopes toward at least one seating adapted to seat the at least one fitting of the instrument assembly. In another embodiment, he instrument system further comprises a second housing member which forms an explosion-proof enclosure with the first housing member to enclose the instrument assembly. The second housing member preferably forms an explosion-proof enclosure with the first housing member via cooperating threading. Explosion proof/flame proof enclosures are generally designed with enough strength to withstand an internal explosion while guarding the external atmosphere from the ignition source. The first housing member and the second housing member can, for example, be fabricated from stainless steel. The instrument assembly can, for example, include electrical components for a combustible gas sensor.

The instrument fitting and the seating can, for example, form a friction fit therebetween to mount the instrument assembly to the first housing member, preferably without the use of tools. The instrument assembly preferably also comprises a handle to remove the instrument assembly from connection with the first housing member, preferably without the use of tools.

In one embodiment, the alignment member preferably comprises a plurality of surfaces which slope toward a plurality of seatings. The instrument assembly preferably comprises a plurality of fittings projecting therefrom. In one embodiment, the alignment member is annular in shape and has a first sloped surface and a second, oppositely sloped surface that connect to a generally circular channel. A plurality of seatings are preferably positioned along the channel.

In another aspect, the present invention provides a method of mounting an instrument assembly to a first housing member including the steps of: moving the instrument assembly toward the first housing member; guiding a fitting on the instrument assembly toward a seating in the first housing member by contacting the fitting with a surface of a guide on the first housing member; and inserting the fitting in the seating. The method can also include the step of connecting a second housing member to the first housing member to enclose the instrument assembly within an explosion-proof enclosure.

As described above, the fitting and the seating preferably form a friction fit therebetween to mount the instrument assembly to the first housing member, preferably without the use of tools. Likewise, the instrument assembly further comprises a handle to remove the instrument assembly from connection with the first housing member, preferably without the use of tools.

DETAILED DESCRIPTION OF THE INVENTION

FIGS. 1 through 6 illustrate a preferred embodiment of an instrument assembly system of the present invention including a first housing member or body 200, an instrument assembly 300 and a second housing member or lid 400. Instrument assembly 300 can, for example, include a frame or housing 302 into which an instrument component or components 500 (for example, a printed circuit board for a combustible gas sensor such as used in the ULTIMA® series of gas monitors available from Mine Safety Appliances Company of Pittsburgh, Pa.) is connectible. Instrument assembly 300 can, for example, include a printed circuit board, one or more microprocessors and a display 510 on a forward end thereof to provide an operator or worker with a readout of analyte gas concentration. Instrument assembly frame 302 and instrument components 500 can be formed separately or can be formed as an integral unit.

Housing body 200 includes a first port 270 to which, for example, a sensor housing 600 (see FIG. 5) including a combustible gas sensor therein can be attached. A suitable explosion proof sensor housing is described, for example, in U.S. patent application Ser. No. 10/161,488, assigned to the assignee of the present invention, the disclosure of which is incorporated herein by reference. Electrical connection (for example, wires) can pass though housing body 200 via a second port 280.

Figure 1:
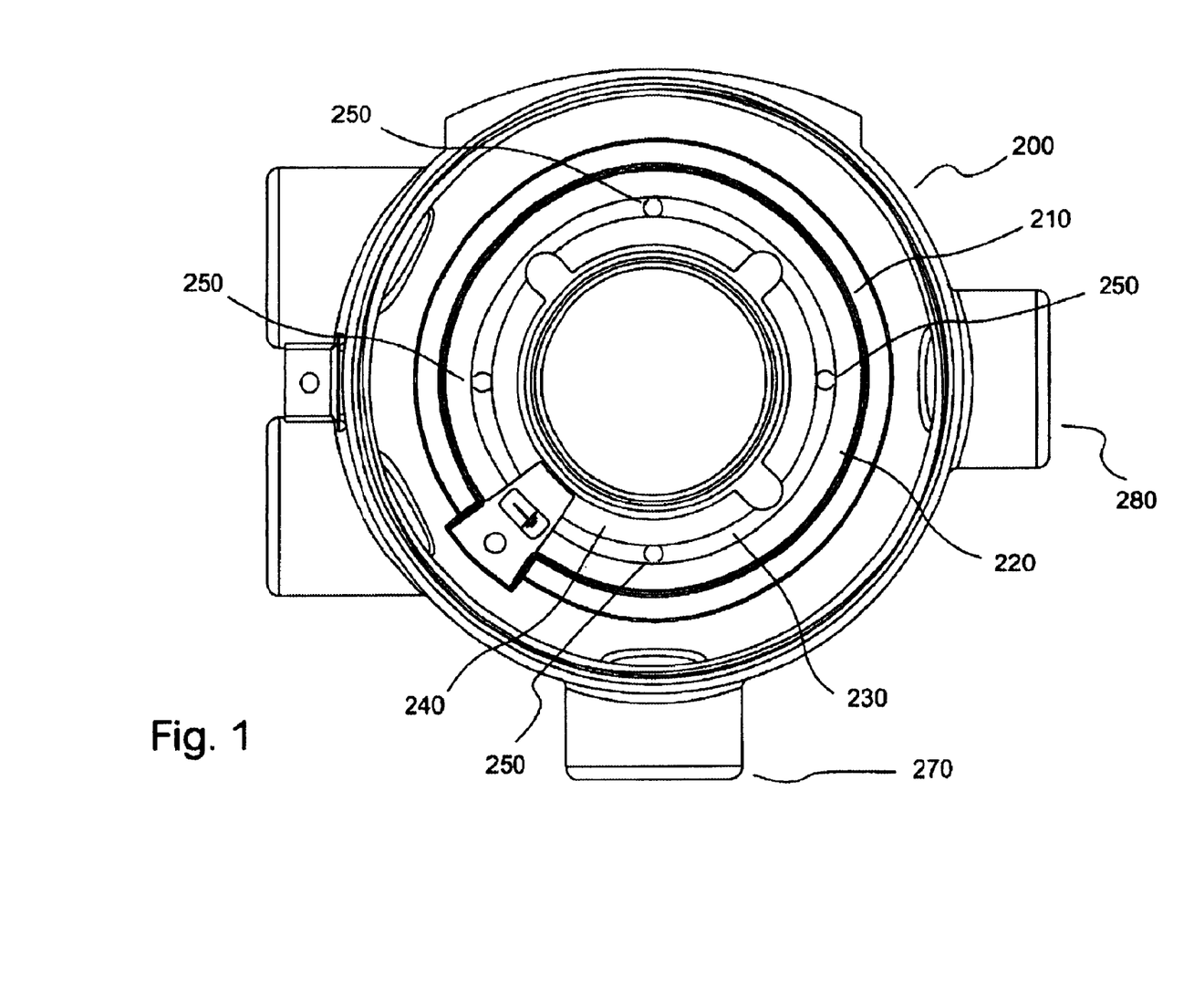
FIG. 1 is a front view of a first housing member having located therein one embodiment of an alignment member of the present invention.
Figure 2:
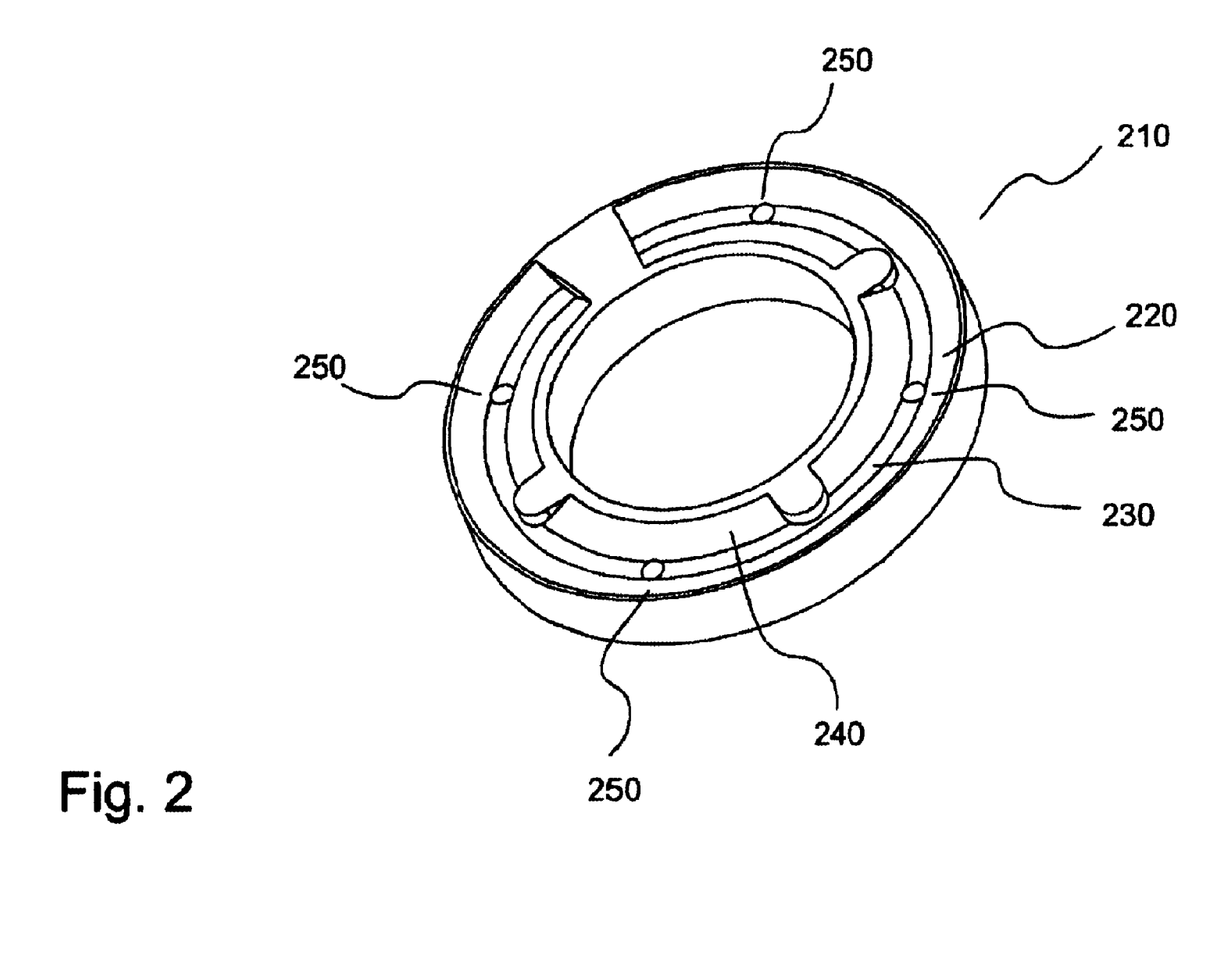
FIG. 2 is a perspective view of an alignment member that is preferably positioned at the rear of the first housing member shown in FIG. 1.

Housing body 200 housing also preferably includes an alignment or guide element such as alignment ring 210 which is positioned and connected at the rear of the interior of housing 200. Alignment ring 210 or another alignment member can be formed integrally with housing body 200 or can be formed separately therefrom and mounted thereto. Use of the terms "connected" or "attached" with respect to alignment ring 210 and housing body 200 includes both integral formation thereof and separate formation and subsequent attachment of alignment ring 210 to housing body 200. Alignment ring 210 can, for example, include a first sloped surface 220 and a second, oppositely sloped surface 240 that converge to a generally central circular channel 230. Seatings 250 are positioned around generally circular channel 230.

Figure 3:
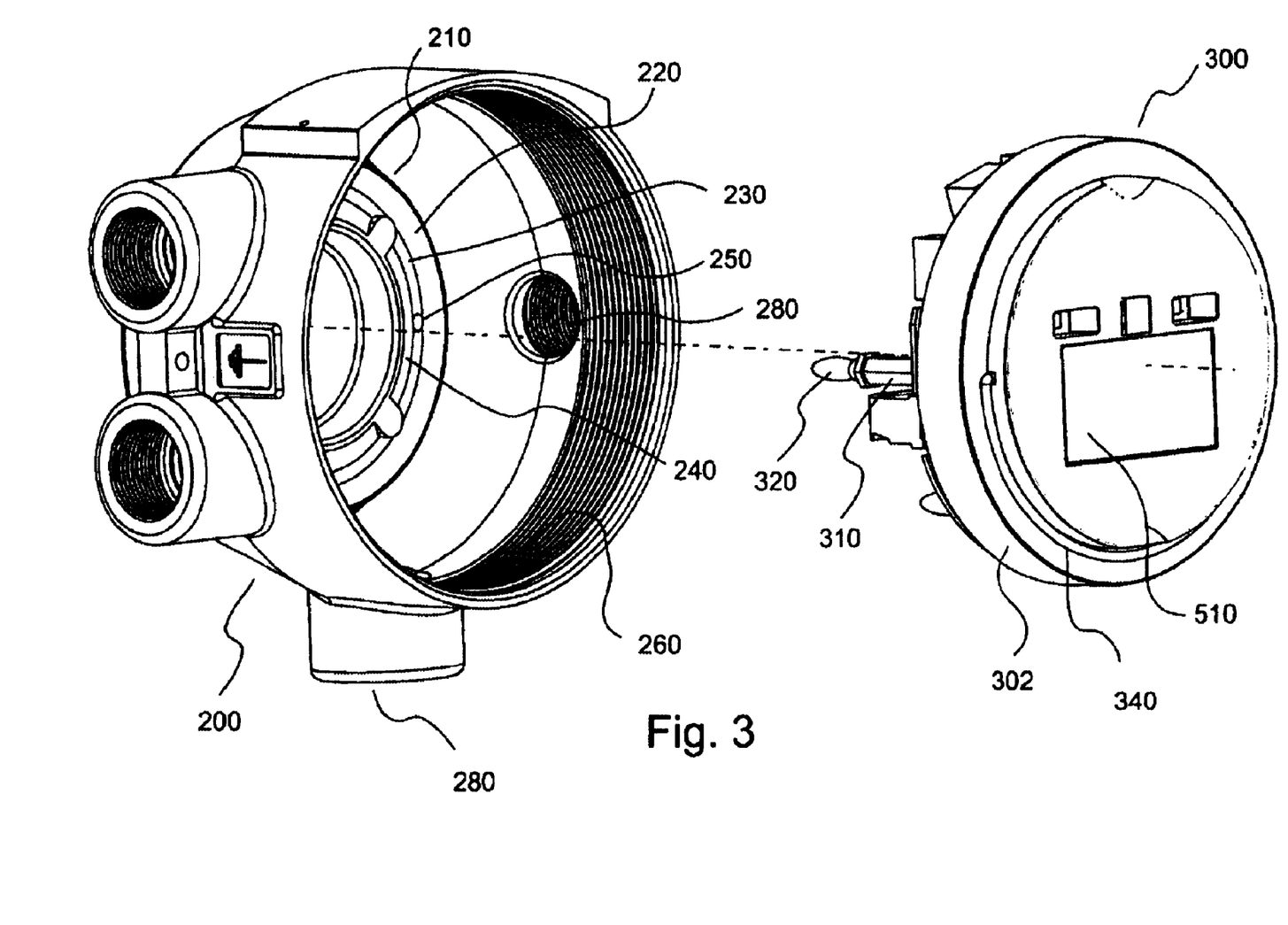
FIG. 3 is a perspective view of an embodiment of an instrument assembly and the first housing member shown in FIG. 1 wherein the instrument assembly is aligned for connection to the alignment member within the first housing member.
Figure 4:
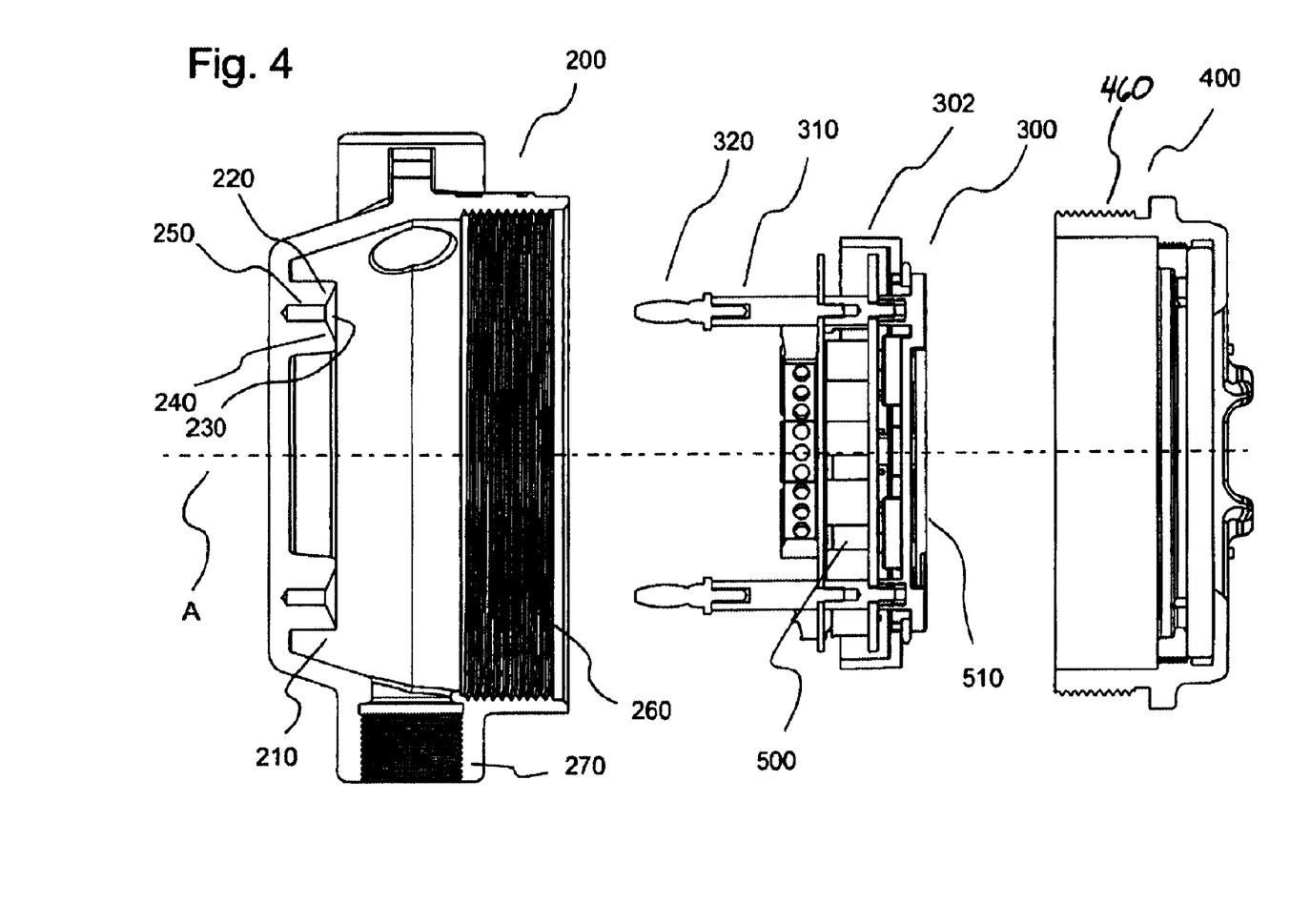
FIG. 4 is a side, cutaway or bisected view of the instrument assembly system with the first housing member, the second housing member and the instrument assembly in a disconnected state.

Alignment ring 210 acts as a guide or track to appropriately align fittings 320 to be seated in seatings 250. In that regard, instrument assembly 300 includes rearward extending members 310 to which fittings 320 are attached. To mount instrument assembly 300 to housing body 200, instrument assembly 300 is first generally aligned to be generally coaxial along an axis A with housing body 200 as illustrated in FIGS. 3 and 4. Instrument assembly 300 is then moved rearward relative to housing body 200 until fittings 320 contact alignment ring 210. Precise or accurate initial alignment of instrument assembly 300 with respect to housing body 200 is not required, facilitating quick connection and disconnection. Fittings 320 contact sloped surfaces 220 and 240 which cause fittings 320 to track toward channel 230.

Figure 5:
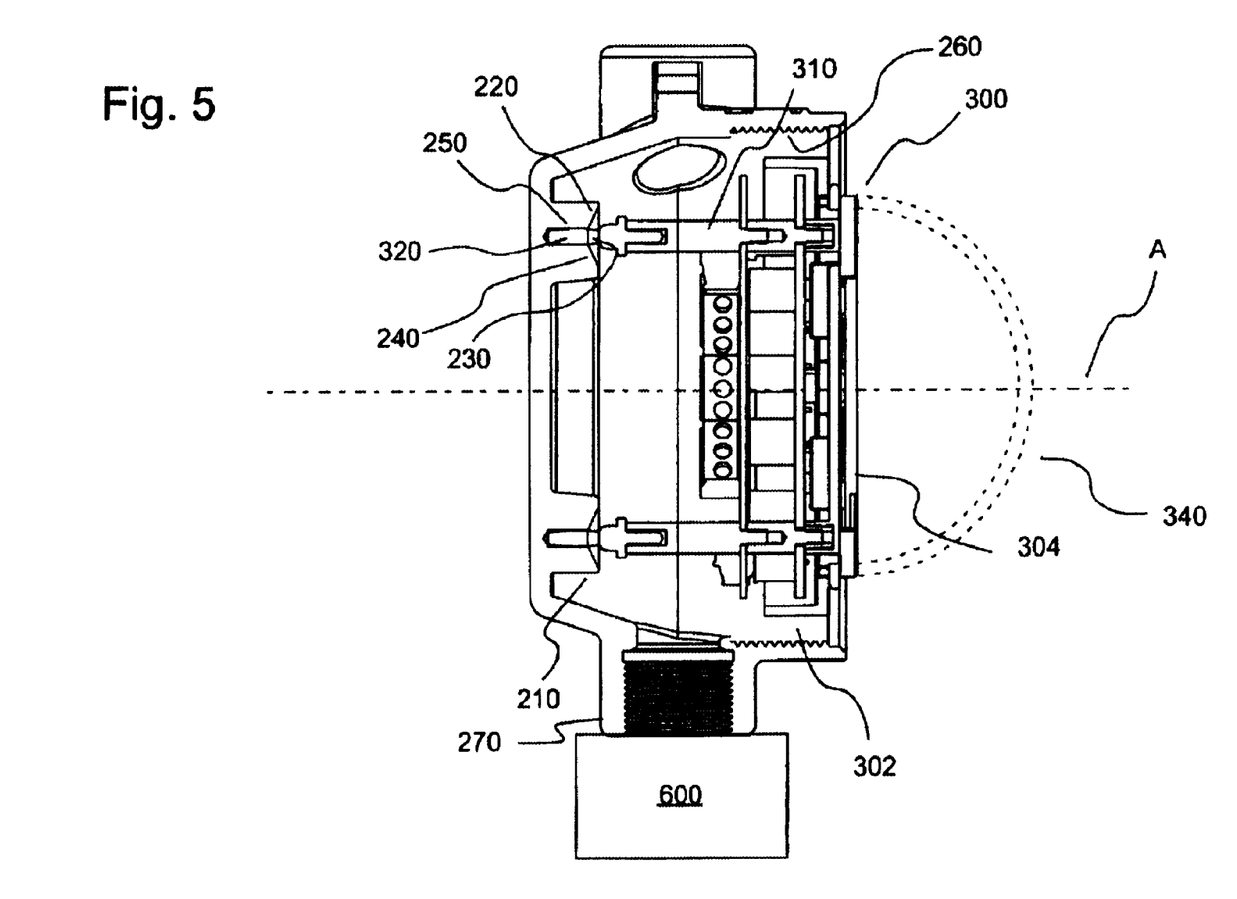
FIG. 5 is a side, cross-sectional view of the instrument assembly and the first housing member of FIG. 3 in a connected state.
Figure 6:
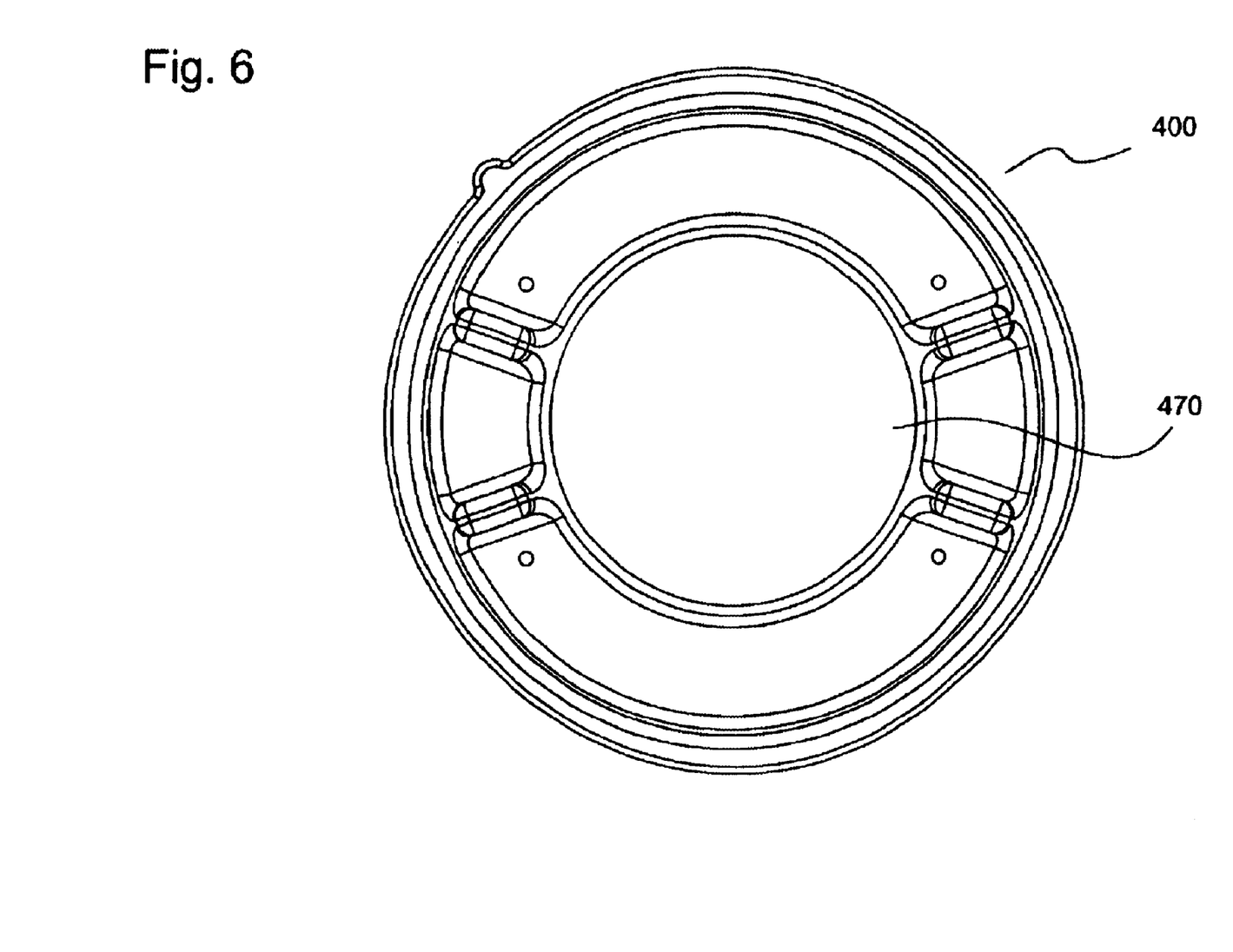
FIG. 6 is a front view of the second housing member of FIG. 4.

Rotation (either in a clockwise or counter-clockwise direction) of instrument assembly 300 causes fittings 320 to track along channel 230 until seatings 250 are located. Application of rearward force to instrument assembly 300 causes fittings 320 to seat within seatings 250 as illustrated in FIG. 5. In one embodiment of a sensor housing, connection of at least one fitting 320 with a corresponding seating 250 provided an electrical ground for a sensor instrument assembly 300.

Fittings 320 preferably seat within seatings 250 via a friction fit. In one embodiment, fittings 320 were "banana" fittings or "banana jacks" as known in the art. Once seatings 250 are located, application of a relatively small amount of axially rearward force to instrument assembly 300 causes banana fittings 320 to squeeze into seatings 250. A friction fit between seatings 250 and banana fittings 320 causes instrument assembly 300 to be securely retained.

Removal of instrument assembly 300 from connection with housing body 200 requires only application of an axial forward force to instrument assembly 300. Instrument assembly 300 can, for example, include a semicircular handle or bail 340 attached to frame 302. Bail 340 is illustrated in dashed lines as extended for disconnection of instrument assembly 300 from housing body 200 in FIG. 5. When not in use, bail 340 can be rotated to its unextended position illustrated in FIG. 3.

Second housing member or housing lid 400 can be connected to housing body 200 form a complete enclosure around instrument assembly 300. For example, housing lid 400 can include threading 460 which cooperates with threading 260 of housing body 200 to form an a flame-proof or an explosion-proof enclosure as described, for example, in U.S. patent application Ser. No. 10/161,488. Housing lid 400 can also include a transparent section or window 470 to allow viewing of display 510 and/or other instrument components within the housing formed by housing body 200 and housing lid 400.

Figure 7:
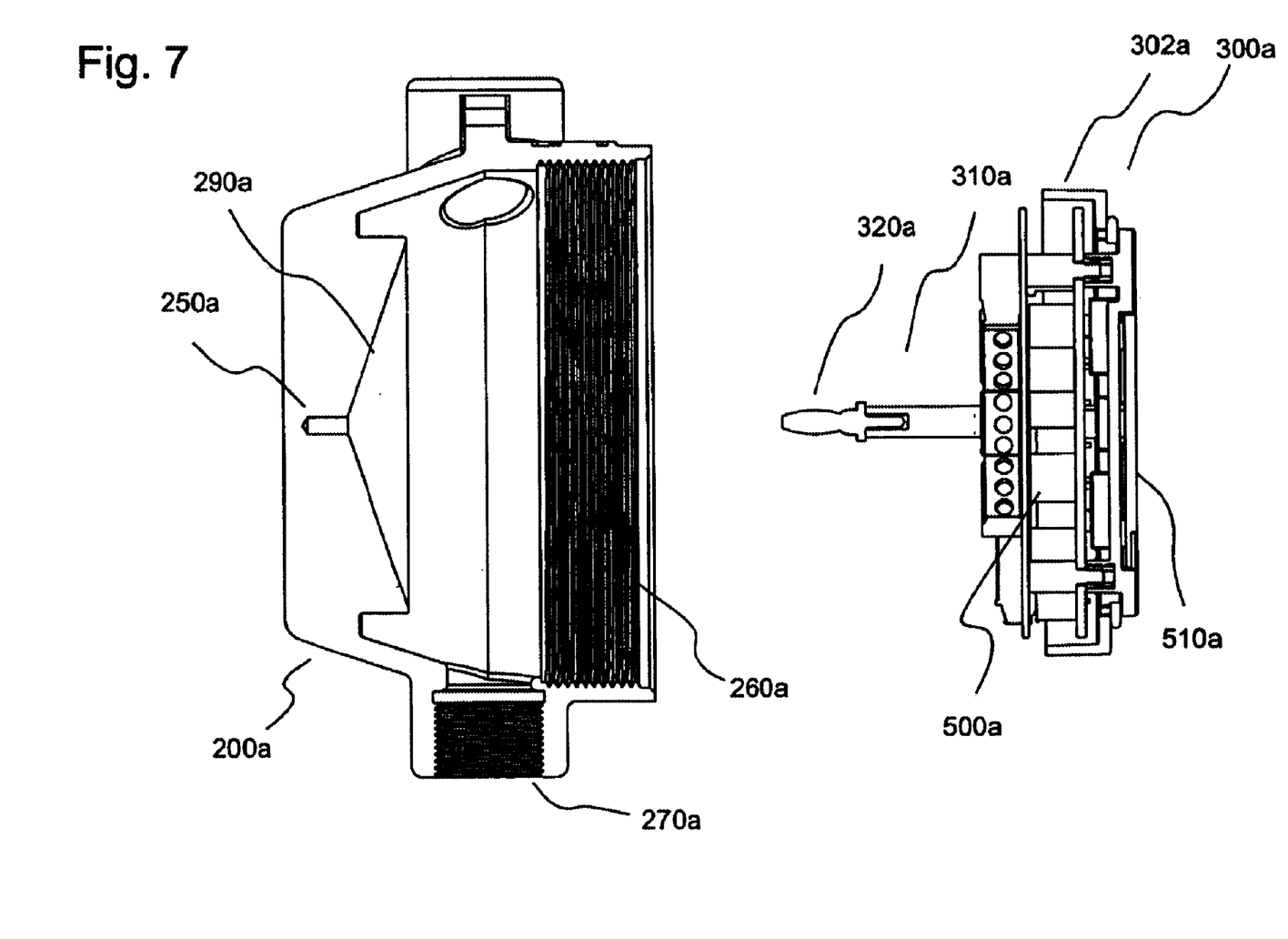
FIG. 7 is a side, cutaway or bisected view of another instrument assembly system of the present invention with the first housing member and the instrument assembly in a disconnected state.

FIG. 7 illustrates another embodiment of an instrument assembly system of the present invention including a first housing member or body 200a and an instrument assembly 300a. In many respects, housing body 200a and instrument assembly 300a are similar to housing body 200 and instrument assembly 300, and like components are represented with similar numbering in FIG. 7 with the addition of the designation "a". Unlike, housing body 200, however, housing body 200a includes only a single seating 250a which cooperates with a single fitting 320a extending from instrument assembly 300a. Housing body 200a includes an alignment element or guide 290a which includes a continuous sloped surface in the form of a cone or frustum to guide fitting 320a into cooperation with seating 250a.

As described above, seating 250a and fitting 320a can form a friction fit. Connections other than friction fits are also suitable for use in the present invention, however. For example, in the embodiment of FIG. 7 seating 250a and fitting 320a can include cooperating threading. Likewise, in other embodiments similar to the embodiment of FIGS. 1 through 6 a keying or locking cooperation can be included so that the fittings are locked within the seatings upon further rotation of the instrument assembly relative to the housing body once the fittings are first inserted in the seatings.

Preferably, however, the instrument assembly is connectible and disconnectible from the housing body without the use of special or other tooling. As described above, the requirement of the use of such tooling with current instrument assembly/housing systems significantly complicates the use and maintenance thereof.

The foregoing description and accompanying drawings set forth preferred embodiments of the invention at the present time. Various modifications, additions and alternative designs will, of course, become apparent to those skilled in the art in light of the foregoing teachings without departing from the scope of the invention. The scope of the invention is indicated by the following claims rather than by the foregoing description. All changes and variations that fall within the meaning and range of equivalency of the claims are to be embraced within their scope.

What is claimed is:

1. An instrument system comprising:
   an instrument assembly including at least one fitting projecting therefrom, the instrument assembly further including electrical components for a combustible gas sensor;
   at least a first housing member comprising at least one alignment member located therein, the alignment member comprising at least one surface which provides a guide toward at least one seating adapted to seat the at least one fitting of the instrument assembly and connect the instrument assembly to the first housing member regardless of the rotation of the instrument assembly about its axis relative to the first housing; and a second housing member which forms an explosion-proof enclosure with the first housing member to enclose the instrument assembly.

2. The instrument system of claim 1 wherein the fitting and the seating form a friction fit therebetween to attach the instrument assembly to the first housing member without the use of tools.

3. The instrument system of claim 1 wherein the instrument assembly further comprises a handle to remove the instrument assembly from attachment to the first housing member without the use of tools.

4. The instrument system of claim 1 wherein the alignment member further comprises a plurality of surfaces which slope toward a plurality of seatings.

5. The instrument system of claim 4 wherein the instrument assembly includes a plurality of fittings projecting therefrom.

6. An instrument system comprising:

an instrument assembly including at least one fitting projecting therefrom:

at least a first housing member comprising at least one alignment member which guides toward at least one seating adapted to seat the at least one fitting of the instrument assembly, the alignment member being annular in shape and having a first sloped surface and a second, generally oppositely sloped surface that connect to a generally circular channel, the at least one seating being positioned along the channel;

a second housing member which forms an explosion-proof enclosure with the first housing member to enclose the instrument assembly.

7. The instrument assembly connection of claim 6 wherein the instrument assembly includes a plurality of fittings which form a friction fit with a plurality of seatings positioned along the channel.

8. The instrument system of claim 7 further comprising a second housing member which forms an explosion-proof enclosure with the first housing member to enclose the instrument assembly.

9. The instrument system of claim 8 wherein the instrument assembly includes electrical components for a combustible gas sensor.

10. The instrument system of claim 9 wherein the fittings and the seatings form a friction fit therebetween to attach the instrument assembly to the first housing member without the use of tools.

11. The instrument system of claim 10 wherein the instrument assembly includes a handle to remove the instrument assembly from connection with the first housing member without the use of tools.

12. The instrument system claim 11 wherein the second housing member forms an explosion-proof enclosure with the first housing member via cooperating threading.

* * * * *